United States Patent [19]

Schwartz et al.

[11] 4,319,556
[45] Mar. 16, 1982

[54] CATALYTIC STOVE

[75] Inventors: Larry A. Schwartz, Warwick; Robert Geiter, Coventry; Peter S. Albertsen, Quidnesset, all of R.I.

[73] Assignee: Jamestown Group, Providence, R.I.

[21] Appl. No.: 241,703

[22] Filed: Mar. 9, 1981

[51] Int. Cl.³ .......................... F24C 1/14; F23J 15/00
[52] U.S. Cl. ...................................... 126/77; 110/203;
126/15 A; 126/163 R; 126/197; 126/289
[58] Field of Search ...................... 126/77, 112, 163 R,
126/163 A, 15 R, 15 A, 197, 192, 190, 289, 290;
122/4 D; 110/203, 208, 209, 214

[56] References Cited

U.S. PATENT DOCUMENTS

| | | | |
|---|---|---|---|
| 4,054,418 | 10/1977 | Miller | 110/203 |
| 4,082,077 | 4/1978 | Marfatia | 126/197 |
| 4,111,181 | 9/1978 | Canney | 126/163 R |
| 4,140,101 | 2/1979 | Glover | 126/77 |
| 4,154,212 | 5/1979 | Wilkinson | 126/77 |
| 4,184,473 | 1/1980 | McIntire et al. | 126/77 |
| 4,200,086 | 4/1980 | Kolb | 126/77 |
| 4,228,783 | 10/1980 | Kalenian | 126/112 |
| 4,232,650 | 11/1980 | Frank | 126/77 |
| 4,232,653 | 11/1980 | Otterpohl | 126/112 |
| 4,287,871 | 9/1981 | Schumann | 126/77 |

*Primary Examiner*—Daniel J. O'Connor
*Attorney, Agent, or Firm*—Salter & Michaelson

[57] ABSTRACT

A wood burning stove having a primary combustion chamber and a secondary chamber having a catalytic converter therein is disclosed. Primary air is introduced to said primary chamber and secondary air is introduced to said secondary chamber utilizing completely separate and independent control means, with the draft means for said primary and secondary air both being located below the fuel (wood) support level. Means are provided for preheating both the secondary air and the catalytic converter.

13 Claims, 7 Drawing Figures

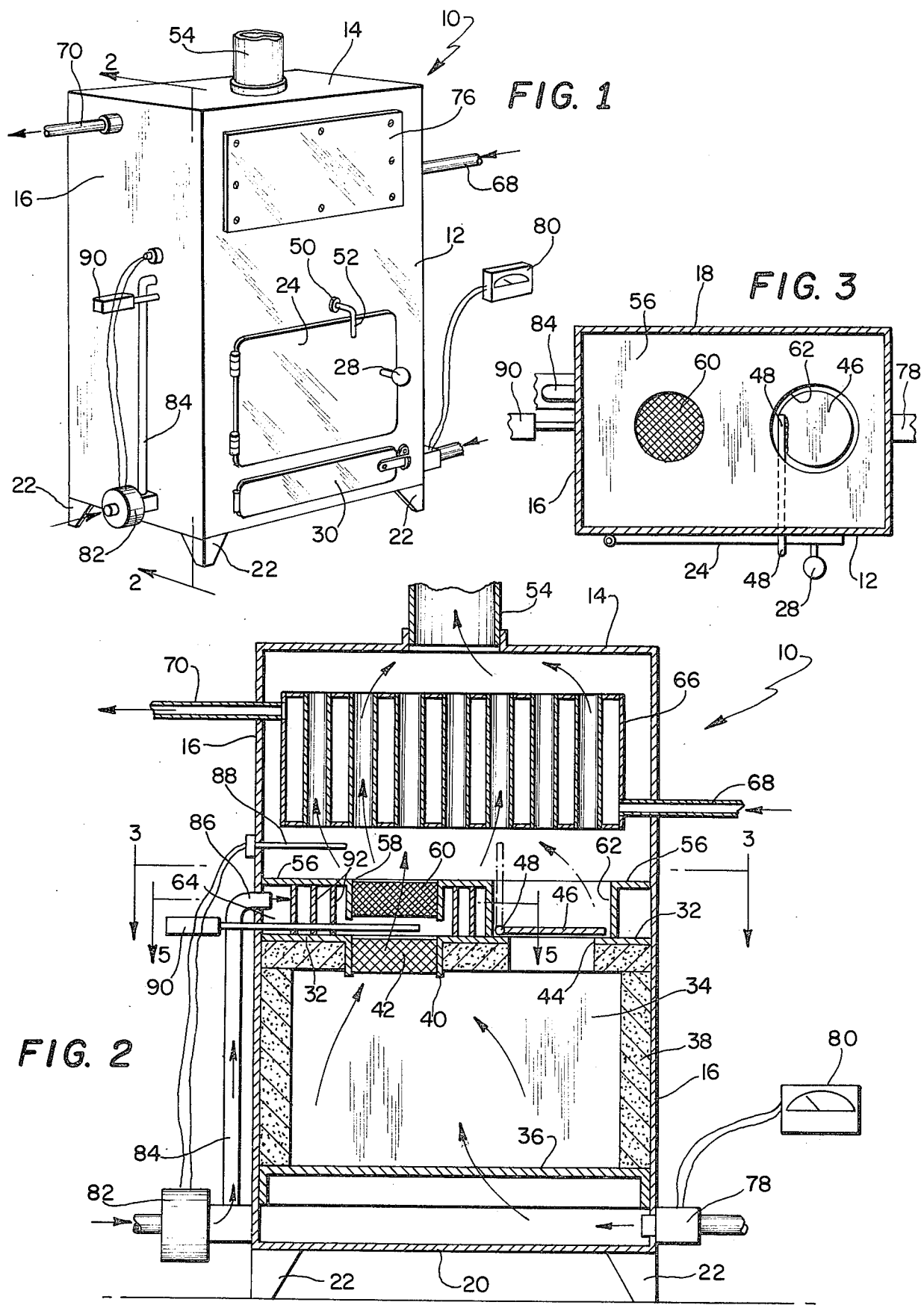

CATALYTIC STOVE

BACKGROUND AND SUMMARY OF THE INVENTION

The present invention relates to stoves of the space heater variety and/or stoves which may be used as a furnace. In most cases the fuel used for such stoves is wood, although other fuels, such as coal, for example, may be used. Although not limited thereto, the present invention relates primarily to wood burning stoves of the airtight variety.

In recent years, due primarily to the energy crisis, wood burning stoves have enjoyed an ever-increasing popularity and public acceptance. The ultimate objective in stoves of this type is to achieve as complete combustion as possible of the combustion gases, since with more efficient combustion, burn time can be increased because it is possible to slow the fire down and still obtain the desired heat transfer for maximum comfort. However, most existing stoves of this type, i.e. airtight wood burning stoves, have a combustion efficiency somewhere in the range of fifty to sixty percent, primarily due to the fact that the ignition point of combustion gases is in the general range of 1300° F. whereas the temperatures generated in stoves of this type are usually in the range of 500° to 900° F. Thus, efficient combustion of these combustion gases has been difficult, if not impossible, to achieve, resulting in lower combustion efficiency, which in turn results in creosote build-up in the chimney or flue, which build-up frequently results in chimney fires. Also, reduced combustion efficiency results in undesirable smoke pollution.

The concept of using a catalytic converter in stoves of this type to obtain greatly increased combustion efficiency is not new and is disclosed, for example, in co-pending U.S. application Ser. No. 195,399, filed Oct. 9, 1980, entitled "Stove Construction". Specifically, by causing the combustion gases to flow through a catalytic converter before reaching the exhaust duct or flue of the stove, the ignition point of the escaping combustion gases is lowered to the general range of 500° F., thus resulting in almost complete afterburn of these gases in the normal range of operating temperatures in stoves of this type. This results in combustion efficiency in the general range of ninety percent, or in other words, an efficiency of approximately thirty-five percent more than that achieved by traditional airtight wood burning stoves. This increased efficiency means little or no pollution will enter the atmosphere because the smoke, a normal by-product of conventional wood stoves, is virtually eliminated, leaving a harmless humid vapor in its place. In addition, as a result of the almost perfect combustion that takes place, there is virtually no creosote build-up in the chimney, thus greatly reducing chimney fire hazards and at the same time reducing chimney maintenance. Furthermore, peak performance can be obtained even with the use of soft and unseasoned wood and burn time can be increased because it is possible to slow the fire down and still maintain almost perfect combustion while transferring heat temperatures necessary for maximum comfort.

The present invention is also directed to the use of catalytic converters in wood stoves, and like the aforesaid co-pending Schwartz application, it is desired to have all of the combustion gases pass through the catalytic converter when the stove is in its normal operating mode. However, since the catalytic converter is in the nature of a filter which to some degree resists or impedes the flow of combustion gases therethrough, it will be apparent that when the access door of the stove is open, the combustion gases and smoke would follow the path of least resistance and would billow outwardly through the open access door. In order to prevent this, the co-pending Schwartz application discloses damper means which must be moved to an open or non-blocking position before the access door of the stove can be opened, thus insuring that the combustion gases and smoke will be exhausted through the flue, rather than being forced into the room through the open access door. The present invention uses this same basic type of damper system, but the present invention utilizes novel and unique means for preventing excess smoke spillage into the room should the catalytic converter become blocked or clogged for any reason. In the aforesaid co-pending Schwartz application, this problem was overcome by the provision of controlled leakage means which permitted combustion gases to exit through the flue in those situations where the damper was in closed position and the converter became clogged or blocked for some reason. In the present invention no such controlled leakage need be provided since it has been found that if all of the draft means in the stove are located below the fuel support level in the stove, then where a blockage occurs, the combustion gases will move downwardly within the stove to the level of the draft means, whereby the gases will actually smother the fire before significant amounts of gases can be forced out through the draft inlets, whereby minimal pollutants will exit from the stove. Thus, an important feature of the present invention is the provision of a wood burning stove wherein all draft control means are located below the fuel support level within the stove, and this applies not only to primary air draft controls, but also secondary air draft controls, etc.

Another important feature of the present invention resides in the fact that it has been found highly desirable to introduce secondary air to the stove at a location adjacent that of the catalytic converter. Specifically, sensing means are provided adjacent the converter which function to sense the presence of unburned hydrocarbons or oxygen in the flue gases after passage through the converter whereby if sufficient combustion is not taking place, a supply of secondary air will be automatically introduced to insure proper air/fuel ratio and hence promote more complete combustion. As previously indicated, even though the secondary air is introduced at a location adjacent the converter which in turn is located above the primary combustion chamber, the draft control means for the secondary air is located below the fuel support level in the primary combustion chamber. Another important feature is the fact the the primary and secondary air supplies and controls are completely separate and independent of each other. Thus, introduction of secondary air to the converter in no way affects the primary air in the firebox.

It is has also been found desirable in the present invention to utilize sequential converters, i.e., a first converter located at the top of the firebox and a second converter in registry therewith and spaced thereabove. The use of sequential converters promotes more complete combustion and hence great overall efficiency.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a stove embodying the present invention in combination with a heat exchanger in order to be used as a furnace;

FIG. 2 is a section taken on line 2—2 of FIG. 1;

FIG. 3 is a section taken on line 3—3 of FIG. 2;

DESCRIPTION OF THE INVENTION

Figure 4:
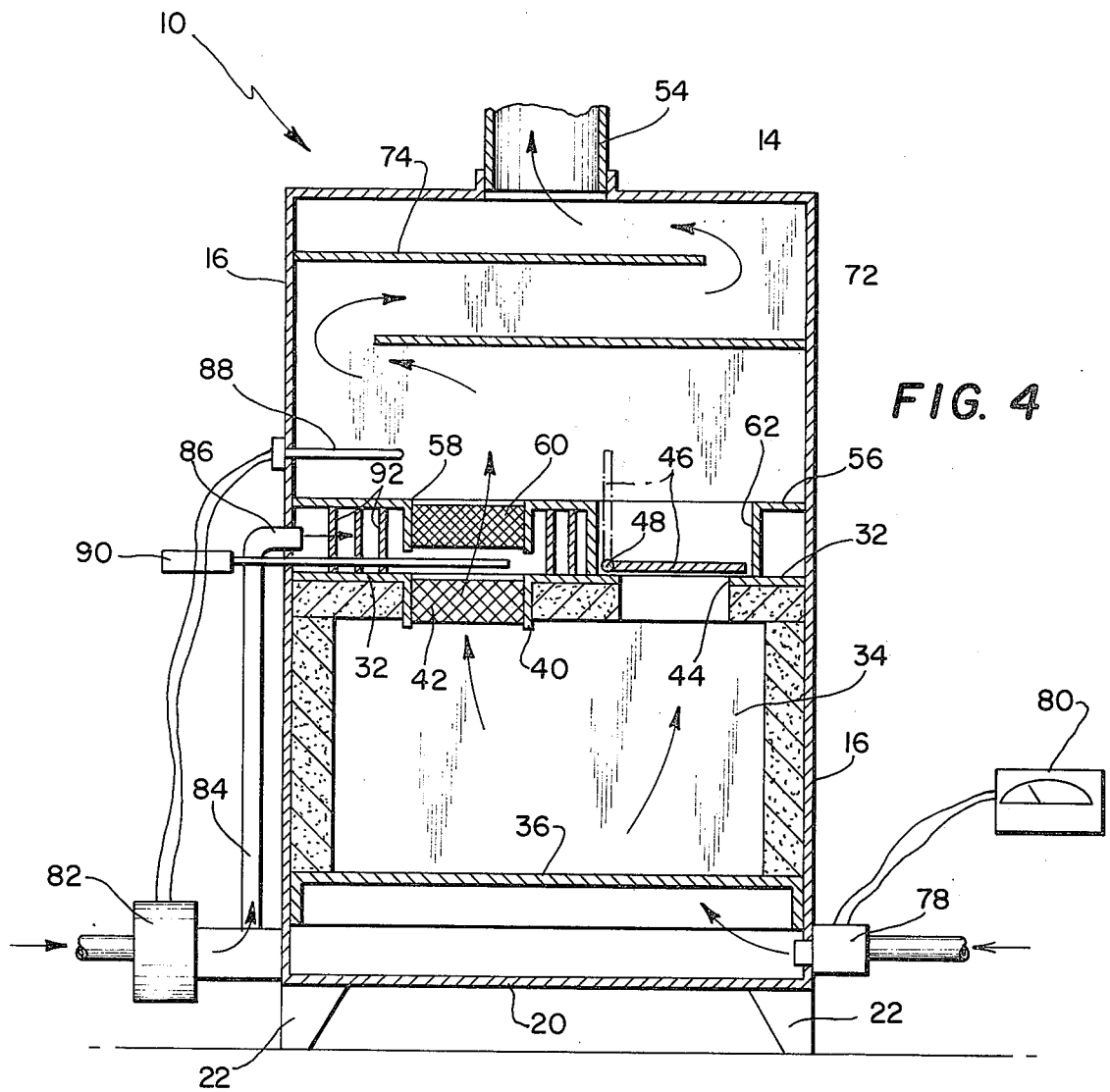
FIG. 4 is a sectional view similar to FIG. 2 showing the stove as a space heater rather than a furnace.

Referring now to the drawings, and more particularly to FIG. 1, there is shown generally at 10 a stove or furnace comprising a front wall 12, top wall 14, side walls 16, rear wall 18, and bottom wall 20 defining a generally complete enclosure. The stove or furnace 10 may be fabricated from any suitable sheet metal or may be of cast iron. A plurality of supporting legs 22 depend from the bottom wall 20, as is conventional.

The front wall 12 is provided with an access opening covered by a door 24 hingedly mounted as at 26 whereby the door may be swung to an open position when it is desired to gain access to the stove or furnace interior for any reason. A conventional handle 28 is provided to facilitate opening movement of the door. A second hingedly mounted door 30 is provided on the front wall 12 slightly below the door 24, the door 30 permitting access to an ashpan (not shown) located at the bottom of the stove, as is conventional.

A horizontal partition 32 located intermediate the height of stove 10 extends thereacross and defines the top wall of primary combustion chamber or firebox 34. Adjacent its bottom the chamber 34 is provided with a support or grate 36 which is adapted to support thereon the fuel to be burned, such as wood logs, it being noted that the support 36, although adjacent the bottom of chamber 34, is spaced above bottom wall 20 to provide space for a conventional ashpan to be inserted, and also to provide space for introduction of primary air. Chamber 13 is provided with a conventional refractory lining 38 at its sides and top.

The partition 32 is provided with a first opening 40 having mounted therein a catalytic converter 42, the details of which form no part of the instant invention, although it will be understood that converter 42 generally comprises a ceramic honeycomb having a thin metallic coating that acts as a catalyst to combustion gases. Specifically, the catalytic effect reduces the normally high ignition point of escaping combustion gases from their normal high range of approximately 1300° F. to a catalyzed average range of approximately 500° F., thus allowing for substantially complete burning of these gases, since the normal operating temperature of wood burning stoves is in the range of 500° to 900° F. A second opening 44 is provided in partition 32, said opening being normally covered by a damper 46 whereby all combustion gases from the firebox 34 are forced to pass through the converter 42. As will be seen most clearly in FIGS. 2 and 3, damper 46 has secured thereto an operating rod 48 which extends outwardly through the front wall 12, as at 50, terminating in a downwardly bent portion 52. As will be seen most clearly in FIG. 1, downwardly extending portion 52 blocks opening movement of the door 24 until the portion 52 is pivoted upwardly so as to no longer interfere with opening movement of the door. Such pivoting movement causes the damper 46 to swing to the open or broken line position illustrated in FIG. 2, whereupon before door 24 can be opened, damper 46 is first opened to permit the combustion gases to flow unimpeded through opening 44 and subsequently through flue or exhaust duct 54 located on top wall 14. This prevents the combustion gases and smoke located in firebox 34 from billowing outwardly through the front of the stove when the door 24 is opened.

A second horizontal partition 56 is spaced slightly above partition 32 and is provided with a first opening 58 having a catalytic converter 60 mounted therein in registry with converter 42. Partition 56 has a second opening 62 in registry with opening 44, the opening 62 permitting flue gases and smoke to flow upwardly to flue 54 when damper 46 is in open position. The space between partitions 32 and 56 defines a secondary chamber 64 while the space above partition 56 may receive therein a heat exchanger 66 having an inlet conduit 68 and an outlet conduit 70 whereby any desired fluid such as water, air, etc. may be circulated therethrough and heated by the combustion gases passing upwardly to flue 54. Thus, in the form of the invention illustrated in FIG. 2, the stove 10 is actually functioning as a furnace, whereas in the form illustrated in FIG. 4, the upper chamber has no heat exchanger therein, but rather is provided with baffles 72, 74 for increasing the path of the flue gases in order to maximize radiant heat provided by the stove. Thus, the stove illustrated in FIG. 4 functions as a space heater, as opposed to the furnace illustrated in FIG. 2. It will be understood, however, that except for the heat exchanger illustrated in FIG. 2 and the baffles illustrated in FIG. 4, the stoves are identical in all respects. Where the heat exchanger 66 is employed, the stove or furnace 10 is provided with a removable panel 76 (FIG. 1) to permit access to the heat exchanger when necessary or desirable.

It will be understood that the sequential converters 42 and 60 provide more complete combustion than where only a single converter is used. Specifically, after combustion gases have passed through the first converter 42, a relatively small degree of uncombusted gas may still exist. By then passing through the second converter 60, a large percentage of these uncombusted gases are burned, thereby promoting greater overall efficiency for the stove. Where sequential converters are employed, it has been found that best results are achieved where the second converter has somewhat smaller cell openings than the first converter, i.e., the second converter is actually a finer filter than the first converter.

Figure 5:
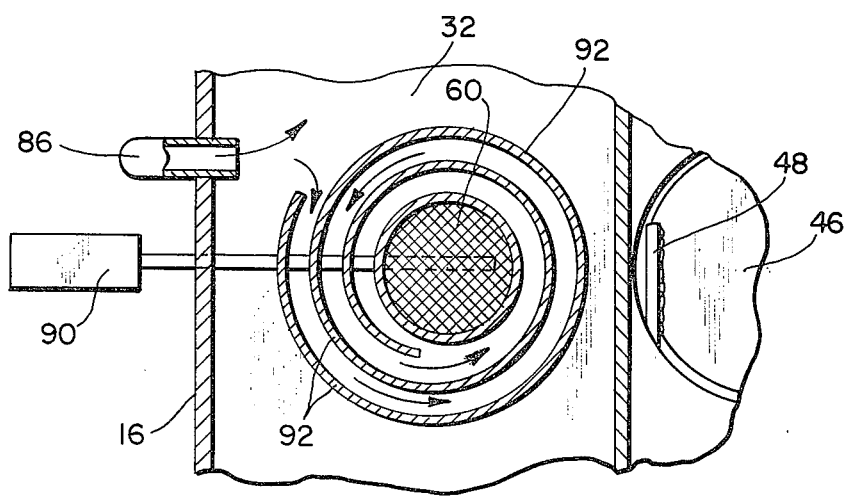
FIG. 5 is a section taken on line 5—5 of FIG. 2.
Figure 5A:
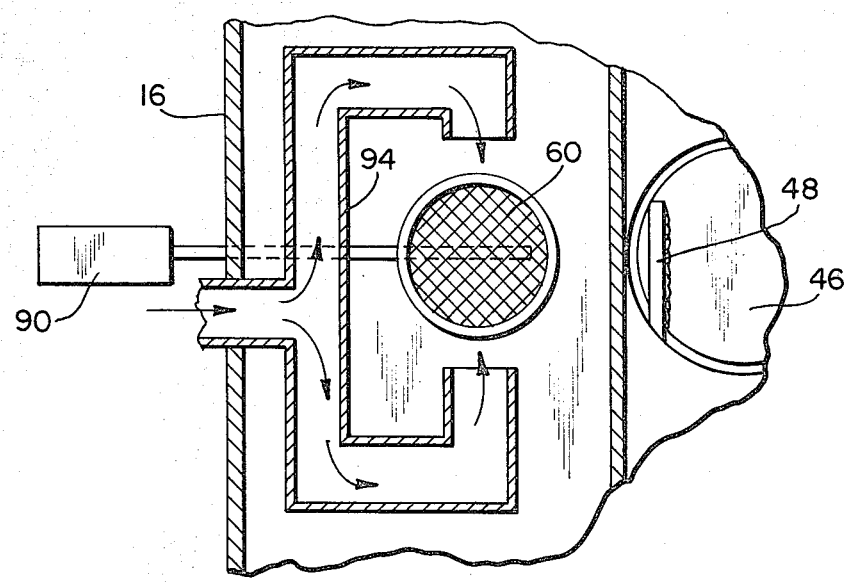
FIG. 5A is a sectional view similar to FIG. 5 showing a modified preheating arrangement.

Primary air is introduced to the primary combustion chamber or firebox 34 by draft control means 78 which may be automatically controlled by thermostat 80. Specifically, thermostat 80 senses room temperature and where more heat is required, automatically actuates a solenoid or blower (not shown) associated with draft control 78 to introduce primary air to firebox 34. Where sequential converters are used, as illustrated in FIGS. 2 and 4, it has been found necessary to introduce a supply of secondary air to secondary chamber 64. This is accomplished by draft control means 82 which cause a supply of air to pass through conduit 84 which extends upwardly along the exterior of of one of the sidewalls of the stove 10 and terminates with an inwardly extending portion 86 which extends through sidewall 16 into secondary chamber 64. Draft means 82 is preferably automatically controlled by a sensing device 88 that also extends through sidewall 16, but at a location slightly above partition 56 and the second converter 60. Sensing device 88 senses the presence of unburned hydrocarbons or oxygen in the flue gases that are passed through both converters and where a sufficient degree of unburned carbons or oxygen exist, sensing device 88 automatically actuates a solenoid or blower associated with draft control 82 to introduce secondary air to chamber 64. A heating device, such as a calrod heater 90, extends through sidewall 16 into chamber 64, said heating device functioning to maintain the converters at their operating temperatures and at the same time functioning to preheat the secondary air being introduced into chamber 64. Specifically, the incoming secondary air is caused to pass through spiral metallic walls 92, as illustrated in FIG. 5 to reach the converters, it being understood that spiral wall 92 has been heated by the heater 90 and hence the incoming secondary air is heated as it passes therethrough. FIG. 5A illustrates an alternative preheating embodiment wherein the incoming secondary air communicates with bifurcated passage or manifold 94, the incoming flow being diverted so as to be introduced at opposite sides of the converters, it being understood that the walls of the passage 94 are heated by the heating means 90 so as to preheat the secondary air passing therethrough. Although the automatic operation achieved by thermostat 80 and sensing device 88 is highly desirable, it will be understood that draft controls 78 and 82 could be manually controlled.

It is important to note that both draft controls 78 and 82 are located below the fuel support level in primary chamber 34, or in other words, below the support or grate 36. Because of this particular arrangement, it has been found that where a blockage or clogging of one of the catalytic converters occurs, and with damper 46 in its normally closed position, the combustion gases will move downwardly through the firebox 34 seeking the level of the draft means 78 and 82. In so doing, the combustion gases, smoke, etc., will effectively smother the fire in chamber 34 whereby no significant amounts of gases or pollutants will exit through the draft inlets. Thus, it is essential that the draft means for the secondary air be located below the support level 36, rather than at the level of entry of said secondary air into the stove, as at 86.

Figure 6:
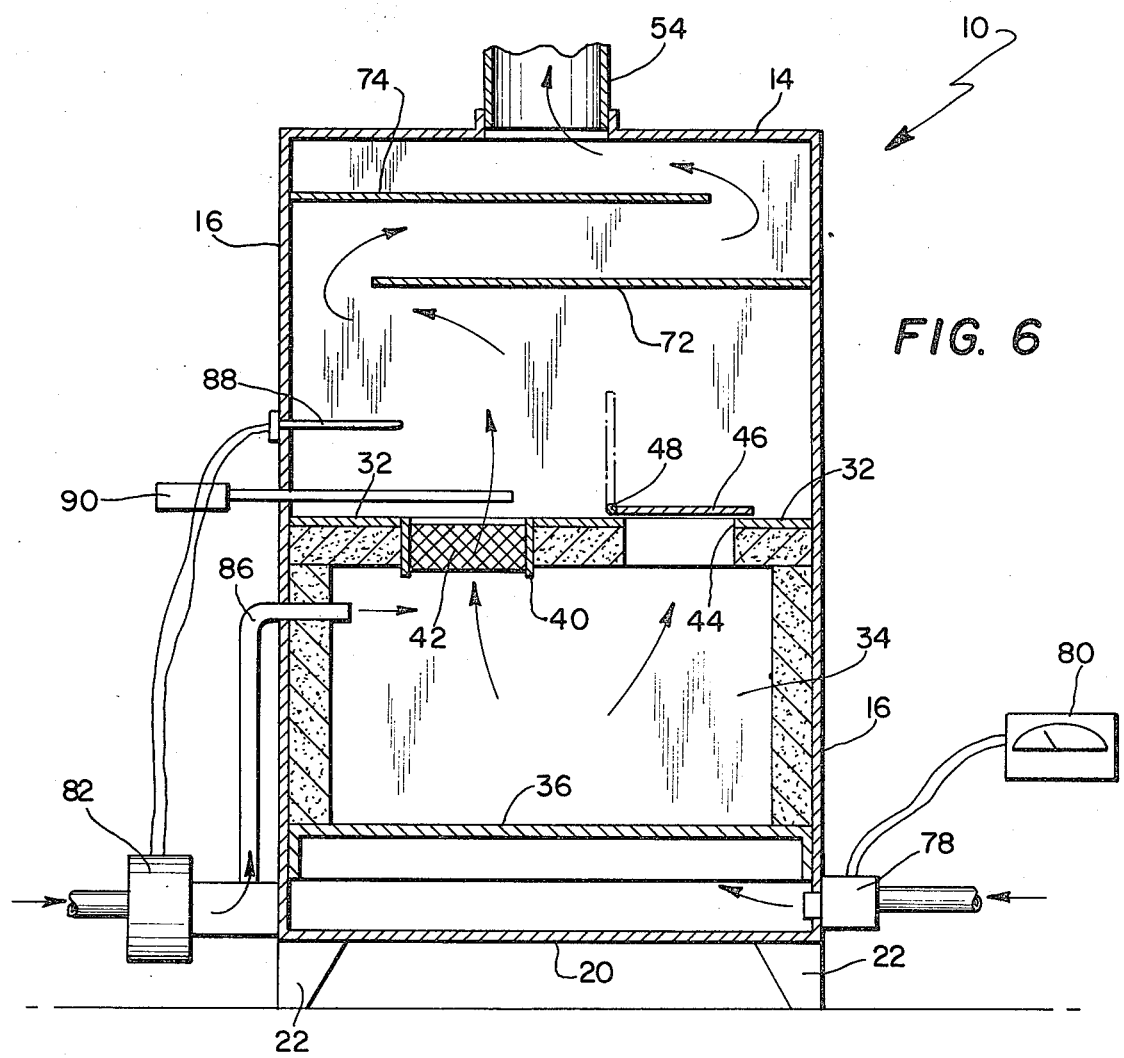
FIG. 6 is a sectional view similar to FIG. 4 showing a modification wherein only one catalytic converter is utilized.

It is also important to note that the primary and secondary air are controlled completely separately and independently of each other. This insures that proper air/fuel ratio can be maintained in the secondary chamber without in any way affecting the air/fuel ratio that exists in the primary combustion chamber. Although it has been found essential to introduce secondary air where sequential converters are used, it is not necessarily essential to introduce secondary air where a single catalytic converter is employed, although it has been found highly desirable to do so. FIG. 6 illustrates a stove that is similar to the stove illustrated in FIG. 2 or FIG. 4, except that only one catalytic converter 42 is employed, it being noted that partition 56 and converter 60 have been eliminated. In such an arrangement the secondary air is introduced into primary chamber 34 at a location just below the converter 42 to achieve the desired air/fuel ratio. In such an arrangement the secondary air may be automatically controlled by the same kind of sensing device 88 but no preheating means are necessary in this arrangement. It will be understood that although two sequential converters are probably the most that will be required to achieve desired efficiency, any number of sequential converters could be employed, with each additional chamber having its own supply of air controlled separately and independently from all other chambers.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A stove comprising front, rear, top, bottom and side walls, a door on said front wall movable between closed and open positions to permit access to the stove interior, a substantially horizontal partition in said stove located intermediate said top and bottom walls, the space between said partition and said bottom wall defining a primary combustion chamber, support means located adjacent the bottom of said primary chamber for supporting the fuel to be burned therein, first draft means for controlling introduction of primary air to said primary chamber and being located adjacent the bottom of said primary chamber, said partition having two openings therein, a catalytic converter mounted on said partition in registry with one of said openings whereby all gases passing through said one opening pass through said converter, damper means movable between a first position normally completely covering said other opening and a second position wherein said other opening is unblocked, handle means operable from outside the stove to move said damper between said first and second positions, said handle means blocking opening movement of said door when said damper is in its said first position, whereby said door can be opened only when said damper has been moved to its said second position, second draft means for controlling the introduction of secondary air to said stove at a location adjacent said partition, said second draft means being located adjacent the bottom of said primary chamber, and an exhaust duct communicating with said stove at a location above said partition.

2. In the stove of claim 1, said first and second draft means both being located below the level of said fuel support means.

3. In the stove of claim 1, temperature sensing means located exteriorly of said stove for automatically controlling operation of said first draft means.

4. In the stove of claim 1, sensing means for automatically controlling operation of said second draft means, said sensing means extending into said stove at a location adjacent said converter and being effective to sense the presence of unburned hydrocarbons or oxygen at said location, whereby secondary air is automatically introduced should sufficient unburned hydrocarbons or oxygen be present.

5. In the stove of claim 1, means for preheating said secondary air and said converter.

6. In the stove of claim 1, a second substantially horizontal partition located above said first position and having two openings therein in registry with the openings in the first partition, a second catalytic converter mounted in one of said openings in registry with said first converter, the space between said partitions defining a secondary chamber, and conduit means extending into said secondary chamber for introducing said secondary air.

7. In the stove of claim 6, said first converter having larger cell sizes than said second converter.

8. In the stove of claim 6, sensing means for automatically controlling operation of said second draft means, said sensing means extending into said stove at a location slightly above said second partition and being effective to sense the presence of unburned hydrocarbons or oxygen at said location whereby secondary air is automatically introduced should sufficient unburned hydrocarbons or oxygen be present.

9. In the stove of claim 8, temperature sensing means located exteriorly of said stove for automatically controlling operation of said first draft means.

10. In the stove of claim 9, heating means in said secondary chamber for preheating said secondary air and said converters.

11. In the stove of claim 10, said first and second draft means both being located below the level of said fuel support means.

12. In the stove of claim 11, said secondary air conduit extending upwardly from said draft control along the exterior of said stove and then inwardly into said secondary chamber.

13. In the stove of claim 12, said exhaust duct being located in said top wall, and a heat exchanger located in the space between said second partition and said top wall.

* * * * *